United States Patent
Wenzel

(10) Patent No.: US 12,401,631 B2
(45) Date of Patent: Aug. 26, 2025

(54) COMMUNICATION METHOD AND SYSTEM FOR PROVIDING A VIRTUAL COLLABORATION SPACE

(71) Applicant: Mitel Networks Corporation, Kanata (CA)

(72) Inventor: Mattias Wenzel, Jordbro (SE)

(73) Assignee: MITEL NETWORKS Corporation, Kanata (CA)

( * ) Notice: Subject to any disclaimer, the term of this patent is extended or adjusted under 35 U.S.C. 154(b) by 358 days.

(21) Appl. No.: 17/558,210

(22) Filed: Dec. 21, 2021

(65) Prior Publication Data
US 2022/0200979 A1 Jun. 23, 2022

(30) Foreign Application Priority Data
Dec. 22, 2020 (EP) .................................. 20216489

(51) Int. Cl.
*H04L 9/40* (2022.01)
*H04L 65/1069* (2022.01)
(Continued)

(52) U.S. Cl.
CPC ............ *H04L 63/08* (2013.01); *H04L 63/083* (2013.01); *H04L 63/10* (2013.01); *H04L 63/105* (2013.01);
(Continued)

(58) Field of Classification Search
CPC ... H04L 65/4015; H04L 65/403; H04L 63/08; H04L 63/083; H04L 63/10; H04L 63/105
See application file for complete search history.

(56) References Cited

U.S. PATENT DOCUMENTS 10,616,278 B1 * 4/2020 Johansson ............. H04L 65/403
2006/0053380 A1 3/2006 Spataro et al.
(Continued)

OTHER PUBLICATIONS

Microsoft Education, Youtube video with title "How to use Whiteboard in Microsoft Teams", dated Aug. 12, 2020. Retrieved From: https://www.youtube.com/watch?v=YBnojDFXo4k, retrieved on Apr. 17, 2025.
(Continued)

*Primary Examiner* — Nam T Tran

(57) ABSTRACT

A communication method comprising generating a virtual space comprising one or more virtual subspaces, each virtual sub-space comprising a directory address, at least one associated function including a communication function, and customisable settings; receiving a request from a user device to access the virtual space providing the user device with access to the virtual space according to an access level associated with a user of the user device, the access level providing the user device with a predetermined selection of the virtual sub-spaces; in response to receiving a selection request from the user device to select a virtual sub-space from the predetermined selection of virtual sub-spaces, providing the user device with access to the virtual sub-space with the associated functions; associating the respective directory address of the virtual sub-space with the user device; and establishing a communication link between the user device and a second user device via the communication function of the virtual sub-space.

18 Claims, 6 Drawing Sheets

(51) Int. Cl.
    *H04L 65/401*     (2022.01)
    *H04L 65/403*     (2022.01)
    *H04L 67/131*     (2022.01)

(52) U.S. Cl.
    CPC ...... *H04L 65/1069* (2013.01); *H04L 65/4015* (2013.01); *H04L 65/403* (2013.01); *H04L 67/131* (2022.05)

(56) References Cited

U.S. PATENT DOCUMENTS

| | | | |
|---|---|---|---|
| 2012/0254305 A1* | 10/2012 | Malkin | G06Q 10/1095 709/204 |
| 2014/0176665 A1* | 6/2014 | Gottlieb | H04L 65/4015 709/204 |
| 2015/0154291 A1 | 6/2015 | Shepherd et al. | |
| 2016/0119315 A1* | 4/2016 | Uzelac | H04L 65/403 709/204 |
| 2016/0234264 A1* | 8/2016 | Coffman | H04L 65/4015 |
| 2016/0255127 A1* | 9/2016 | Baribault | H04L 65/403 709/204 |
| 2019/0369837 A1* | 12/2019 | Davis | H04N 7/157 |
| 2020/0322347 A1 | 10/2020 | Goyal et al. | |
| 2021/0056603 A1* | 2/2021 | Vidal | A63F 13/87 |
| 2022/0070236 A1* | 3/2022 | Yerli | H04L 65/4015 |

OTHER PUBLICATIONS

Fresno Edtech, Youtube video with title "Teams Meetings—Sharing Your Screen and Giving Control", dated Apr. 22, 2020 Retrieved from: https://www.youtube.com/watch?v=xGHAm3sqOr4, retrieved on Apr. 17, 2025.

Aperiolta, Youtube video with title "Outlook and OneNote integration tasks, meetings, contacts and email", dated Aug. 21, 2009 Retrieved from https://www.youtube.com/watch?v=gkf36RSjGig, retrieved on Apr. 17, 2025.

* cited by examiner

COMMUNICATION METHOD AND SYSTEM FOR PROVIDING A VIRTUAL COLLABORATION SPACE

CROSS REFERENCE TO RELATED APPLICATION

This application claims the benefit and priority of European Patent Application No. EP 20216489.3 entitled "COMMUNICATION METHOD AND SYSTEM FOR PROVIDING A VIRTUAL COLLABORATION SPACE," filed on Dec. 22, 2020, the contents of which are hereby incorporated herein by reference.

FIELD

The present disclosure generally relates to methods and systems for communication.

More particularly, the disclosure relates to communication methods and systems for providing a virtual collaboration space.

BACKGROUND

Remote working makes use of electronic communication to allow employees of a workplace to communicate and interact from a remote location, without having to travel to a physical office. To communicate with each other, remote workers can initiate a voice call to a colleague. This may be via telephone communication, for example. However, the colleague receiving the call may be interrupted by the call while they are in the middle of an activity outside of work duties, such as while getting lunch, or spending time with family. Remote workers may send a chat/SMS message via a user device such as a mobile phone to communicate a work related message. Within some remote working collaboration spaces, users may be invited to a meeting application where the user may participate in the meeting by video, chat, or audio, or simply observe what is being discussed or presented. To join a meeting application a user may need to be provided with a link to the meeting, a meeting ID, password, etc. The meeting may be a teleconference, for example. It is difficult for third parties to join the meeting without permission, and so a meeting may only be accessible to users who have been provided with the meeting information.

Some remote working solutions provide a running view of meetings that are planned or underway using a repository/server view. Users can observe who is in a meeting and see which meetings are occupied and by whom at a given time (for example awc.mitel.com). A user would require credentials specific to a particular meeting in order to access that meeting, usually requiring an invite to that meeting. Remote working interfaces may present user presence attributes and status such as "Joe is in a meeting", or "Linda is in a shareholder meeting".

SUMMARY

According to a first aspect, the specification provides a communication method comprising: generating a virtual space comprising one or more virtual subspaces, wherein each virtual sub-space comprises a respective directory address, at least one associated function including a communication function, and one or more customisable settings; receiving a request from a user device to access the virtual space; providing the user device with access to the virtual space according to an access level associated with a user of the user device, the access level providing the user device with a predetermined selection of the virtual sub-spaces; in response to receiving a selection request from the user device to select a virtual sub-space from the predetermined selection of virtual sub-spaces, providing the user device with access to the virtual sub-space with the associated functions; associating the respective directory address of the virtual sub-space with the user device; and establishing a communication link between the user device and a second user device via the communication function of the virtual sub-space.

The method may further comprise determining an access level corresponding to the user based on authentication information received from the user device.

A first access level may provide a first predetermined selection of the virtual sub-spaces to the user device, and a second access level provides a second predetermined selection of the virtual sub-spaces to the user device, wherein the second predetermined selection of the virtual sub-spaces is a larger selection of the virtual sub-spaces that the first predetermined selection of the virtual sub-spaces.

The first access level may be associated with one or more first users where authentication information is not received from user device of the first user, and the second access level associated with a second user where authentication information is received from the user device and authenticated by an authentication provider of the virtual space.

The method may further comprise providing associating a given access level with a user for a limited period in accordance with an invitation.

The communication may comprise at least one of audio, video, and online text.

The method may further comprise receiving a status update request from a user device to update a status of a virtual sub-space, and updating the status of the virtual sub-space in accordance with the status update request.

The method may further comprise receiving a search request from the first user device to search for a second user; and providing information relating to a virtual sub-space occupied by the second user to the first user.

The method may further comprise: receiving a visit request from the first user device to visit a virtual sub-space occupied by the second user at the second user device; and in response to receiving a visit approval response from the second user device, providing access to the virtual sub-space occupied by the second user to the first user such that a communication link is established between the first user device and the second user device.

When a status of the user of a virtual sub-space is set to indicate that the user does not want to be disturbed, the method may further comprise preventing visit requests from being transmitted to the second user device.

According to a second aspect, there is provided an apparatus comprising at least one processor and a tangible, non-transitory memory configured to communicate with the processor, the memory having stored thereon instructions which, when executed by the processor, are configured to cause the apparatus to execute the method according to the first aspect.

The communication system may further comprise a server, a first user device and a second user device, the communication system being configured to perform the method according to any of claims 1 to 9.

The server may be configured to establish the communication link between the first and second user devices.

The server is configured to store settings relating to the one or more virtual sub-spaces and associated functions.

The server may be configured to verify authentication information received from the first and/or second user device, and to associate an access level with a user of a user device based on the received authentication information.

BRIEF DESCRIPTION OF THE DRAWINGS

Examples will now be described, by way of example only, with reference to the accompanying drawings in which.

DETAILED DESCRIPTION

A communication method is described herein. The communication method of the present specification is of particular use in providing a virtual space such as a virtual office environment in which users may interact in a convenient and intuitive manner. The communication method provides for a virtual collaboration environment more closely replicating the physical working environment. The specification describes a way to enhance the virtual collaboration experience. When people walk through the physical confined of an office building, it is intuitive to observe which conference rooms are occupied by certain co-workers, or certain rooms are dedicated to a particular purpose (i.e. customer visits, support huddles, etc.). It is often the case that a worker can enter a room and consider whether they need to be in a meeting, or whether they can sit in even if not invited, or even just join a meeting quietly to listen at the back of the room.

Methods according to aspects of the specification provide for users to hold secure meetings by relying on authentication, yet providing for users having a particular access level to join certain virtual meeting rooms unannounced or without an invitation. Previous method may have shown just a list of meetings currently underway, but may not permit a user to enter the meeting without proper credentials (such as a meeting invitation). Most physical workplaces benefit from non-disclosure agreements that would not prevent fellow staff from attending a workplace meeting to begin with. Yet virtual meeting solutions require even trusted users to provide a meeting PIN or password, for example based on a unique URL (i.e. included in the invitation). For trusted staff, with a trusted common purpose, the barriers to access meetings may be excessive compared to physical collaboration events which may allow any staff member to enter the meeting as a trusted member of an organisation. The security measures in virtual environments are generally intended to keep outside users from infiltrating a secure meeting, but can often hinder effective collaboration between co-workers by introducing additional security barriers compared to the physical workplace.

By creating a virtual space such as a virtual office space that an employee can log into, they can demonstrate that they are at work within a collaboration space. Subsequently, anyone can then virtually knock at an office and be permitted entry or receive a rejection with a text note why. Employees may be able to see the status of other colleagues' offices. A guest may be invited to log in as a guest, and given an access level to give full or limited access to the offices in the virtual space.

Figure 1:
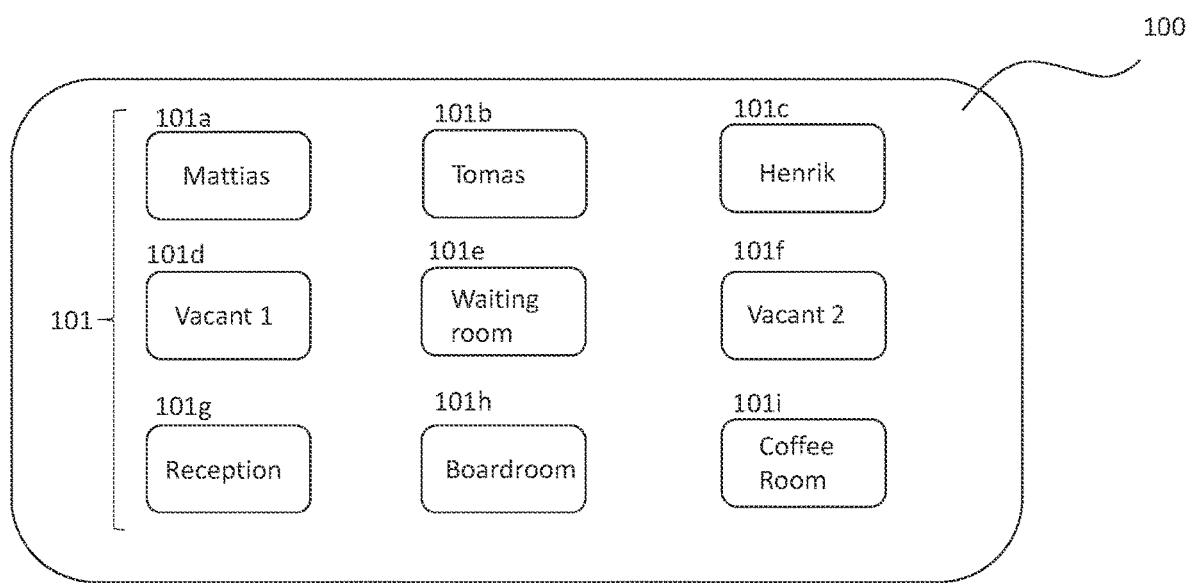
FIG. 1 is a schematic illustration of a virtual space according to aspects of the specification.

An example of a virtual space 100 is illustrated in FIG. 1. The virtual space may be generated for a particular organisation. In the example of FIG. 1, the virtual space is a virtual office space 100. The virtual office space 100 comprises a number of virtual sub-spaces 101. In general, a virtual space according to the present specification comprises one or more sub-spaces 101. The sub-spaces 101 comprise one or more functions, including a communication function. The sub-spaces also comprise one or more customisable settings. The settings and associated functions are stored with a sub-space identifier, such as a directory address. After initial generation of the virtual space, additional sub-spaces may be added to the virtual space, or some sub-spaces may be deleted, depending on the requirements of the organisation.

The virtual sub-spaces may each be assigned a directory address which may be used to contact the occupant of the sub-space. When the sub-space directory address is input by a user internal or external to the virtual space, the communication function directs the communication to the user device of the user occupying the sub-space. When a user is in a virtual sub-space, the communication function may associate their user device with the directory address of the sub-space. Accordingly, a call directed to the directory address of the sub-space may be routed to the user device of the user occupying the sub-space. Similarly user devices receiving communications from the user of the sub-space may be provided with a notification to indicate the directory address of the user's sub-space. Accordingly, the communication function allow the virtual space to function as a dedicated workplace communication apparatus such as a desk phone, establishing communications which are placed and received via the virtual sub-space to the user device of the user of the sub-space.

The sub-spaces 101 of a virtual space 100 may be configured for specific work purposes. For example, sub-spaces 101*a*, 101*b*, and 101*c* in the example of FIG. 1 are provided as employee cubicles. The sub-spaces 100 may have functions and settings associated with them to allow functionality corresponding to a physical employee cubicle. For example, the sub-space 101*a* may be customised for a first employee, Mattias. The sub-space includes a communication function to enable the employee to communicate with other users of the virtual space 100, and with users outside of the virtual space 100. For example, the communication may provide for calls to be placed and received via the directory address of the sub-space, or conference calls to be held, etc. The sub-space 101*a* may include functions for providing digital artefacts configured to replicate a physical office environment. For example, the virtual sub-space 101*a* may include a document storage function for storing digital documents collected by Mattias, which may replicate folders and files of physical and/or digital documents of a physical office. The storage function may store browsing history of the employee, and details of recent meeting-related interactions, for example. In addition, the virtual sub-space 101*a* may comprise a speed-dial list of contacts most frequently used by Mattias, such that the contacts can be contacted using the communication function. In a similar way, a physical desktop phone includes a list of speed dial contacts. The communication function therefore provides functionality usually available via a desktop phone. The speed dial contacts may alternatively be set according to user preference. The communication function enables a communication link to be established between a user device belonging to Mattias i.e. the user of the virtual sub-space 101a and the user device of a contact.

In a similar manner, sub-spaces 101b and 101c may be customised in order to meet the needs of respective employees Henrik and Tomas. The sub-spaces may be customised by the company for which the virtual space is provided. Alternatively or additionally, the sub-spaces may be customised by the employees of the company. Customisation of a sub-space may comprise selecting a number of functions to be provided in the virtual sub-space. Alternatively or additionally, the sub-space may be customised by setting and storing one or more settings relating to the virtual sub-spaces 101 and to the functions of the virtual sub-space. The sub-space may be customised by setting and storing one or more settings relating to the user of the virtual sub-space.

In the example of FIG. 1, other sub-spaces are provided which may provide different functionality to the employee offices 101a-101c. These may comprise the same or different functions. For example, waiting room 101e may have limited functionality and serve as a virtual sub-space for users waiting to access one of the other sub-spaces 101 as described in more detail below. The waiting room may comprise a communication function providing users within the waiting room 101e to communicate with other users. For example, a user waiting to visit a colleague's sub-space may use the communication function to contact the colleague, for example to send a message indicating that they are waiting, or to send a virtual knock to the colleague, for example.

Reception sub-space 101g may be customised such that the user occupying reception 101g is provided with a routing function to route calls from outside the virtual space to a different sub-space in order to establish communication between the appropriate user and the caller external to the company.

The boardroom 101h may be configured to accommodate a large number of users. For example, a teleconference may be established between all users who are present in the boardroom 101h. In addition, the boardroom 101h may be configured to provide communication links with users outside of the virtual space. The boardroom may, for example comprise a function to allow presentations to be delivered to users of the boardroom during a teleconference. For example, screen sharing may be a function provided by the boardroom.

The coffee room 101i may be configured to provide a virtual socialisation space for users of the virtual space 100. That is, a simple communication link may be established between all users of the coffee room 101i. This may be audio, video, or text, for example. More complicated functionality may not be required for the coffee room compared to a virtual sub-space corresponding to an employee cubicle or reception for example. In some examples, the coffee room may be configured to provide functionality such as for users to place a takeaway food order, for example via an application.

Vacant sub-spaces 101d and 101f may initially provide simple functions, such as a communication function to provide for communication links to be set up, but may be further customised by users of the virtual workspace as desired, as described in more detail below. The sub-spaces 101 within the virtual space 100 therefore provide customisable spaces which may be utilised to provide a virtual collaboration environment which closely replicates a physical office environment.

A system and method for providing the virtual collaboration environment will be described in more detail below.

Figure 2:
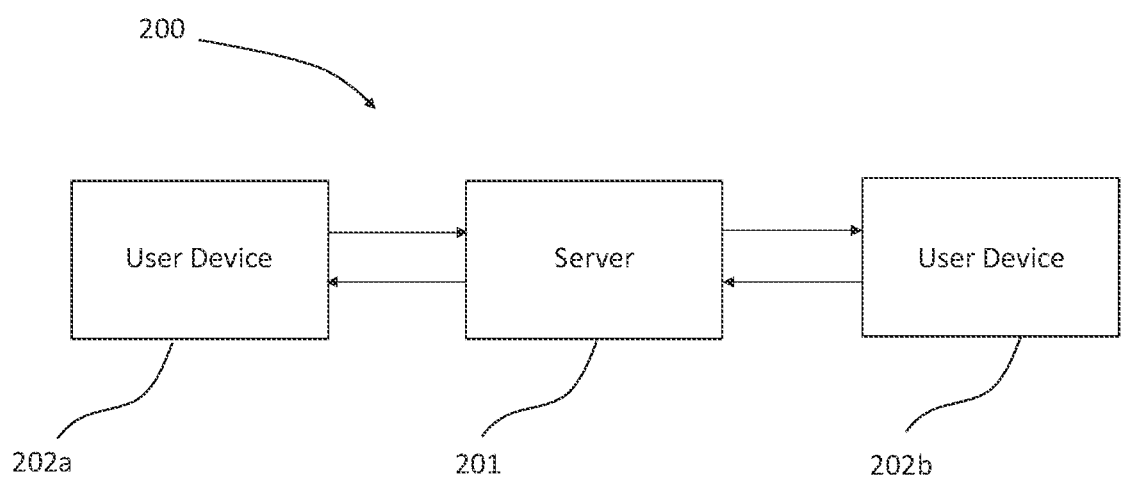
FIG. 2 is a schematic illustration of a communication system according to aspects of the specification.

FIG. 2 illustrates a communication system 200 according to examples of the present specification.

The system 200 may include a server 201, and one or more user devices 202a, 202b. The user device 202a, 202b may be a communication device including a processor and a memory. The memory may be a tangible, non-transitory memory configured to communicate with the processor. The tangible, non-transitory memory may have instructions stored thereon.

The communication system 200 provides a virtual space 100 suitable for use as a virtual work environment. The virtual space 100 may be stored on the server 201. The virtual space 100 is configured to be accessed at the server 201 by one or more user devices 202a, 202b, such that a user of the user device 202 can make use of the functionality provided by the virtual space 100.

The sub-spaces of the virtual space 100 provide for communication to be established between user devices 202a 202b. Communication between user devices 202a, 202b may be established directly or via the server 201. The communication between user devices 202a, 202b may be established by user devices 202a, 202b having access to the virtual space 100. That is, a communication link may be established between users of the virtual space 100. The users may occupy different respective sub-spaces, or they may occupy the same sub-space. In some examples, communication may be established between at least one user device 202a having access to a sub-space of the virtual space 100 and at least one user device 202b which does not have access to the virtual space. That is, in some examples, the communication function of the sub-space may provide for a communication link to be established between user devices 202a, 202b for a user of the virtual space and a non-user of the virtual space.

The user devices 202a, 202b may provide for text, audio, and/or video communications. The user devices 202a, 202b may therefore comprise a display for display of text and visual information, including video, provided via the virtual space 100. The user devices 202a, 202b may comprise a speaker for playing audio received via the virtual workspace or from a user device. In other examples the user devices 202a, 202b may be connected to an external speaker for playing audio received via the virtual space 100 or from a user device 202a, 202b. The user devices may comprise a microphone for communicating audio via the virtual space or to another user device. In other examples, the user devices may be connected to an external microphone for communicating audio via the virtual space or to another use device.

In some examples, the user devices 202a, 202b may support augmented and/or virtual reality applications. Accordingly, the virtual office workplace experience may be made more realistic or entertaining. For example, team interactions can be experienced through virtual or augmented reality to improve team interactions and give the experience of being "together" while working remotely. In addition, the virtual office space may be provided as a virtual/augmented reality experience to make remote working more closely resemble being in a physical office environment.

The server 201 may comprise a processor and memory. The memory may be a tangible, non-transitory memory configured to communicate with the processor. The tangible, non-transitory memory may have instructions stored therefore.

Instructions stored on the memory of one or more of a user device and the server, in response to execution by the processor, may cause the processor to perform operations involved in establishing a communication between a first user device and a second user device.

Figure 3:
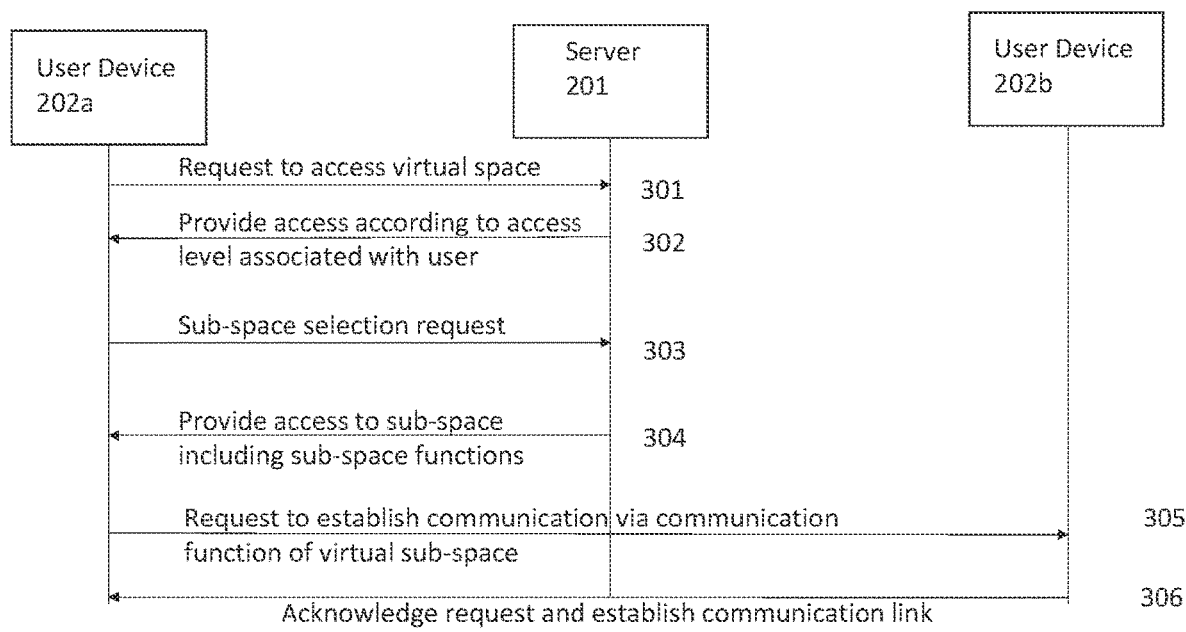
FIG. 3 is a diagram illustrating communications between user devices and a server according to aspects of the specification.

FIG. 3 illustrates an example of transmissions between a user device 202a, user device 202b, and the server 201, facilitated by the virtual space 100.

In the example of FIG. 3, the user device 202a transmits a request to access the virtual to space 100 (301). The request is transmitted to a server 201 which may store the virtual space or at least part of the virtual space 100. The server 201 provides the user device 202a with access to the virtual space 100 according to an access level associated with the user. For example, the user device 202a may transmit with its request for access to the virtual space 100 identification and/or authentication information allowing the server to determine an access level associated with the user of the user device 202a. The user may input identification and/or authentication information via a portal to the virtual space. The server may store a predetermined list of users and a corresponding access level. If the authentication information provided by the user device is accepted by an authorisation provider of the virtual space, then the server may retrieve the stored access level corresponding to the user and provide access to the virtual space accordingly. If the authentication information is not accepted by an authorisation provider of the virtual space, then the user may be denied access to the virtual space, or may be provided with a low access level.

The access level associated with the user provides the user device with a predetermined selection of the virtual sub-spaces 101 (302). For example, a user corresponding to an employee of the company may have an associated access level providing a selection of all the sub-spaces 101 of the virtual space 100. This corresponds largely to the physical office environment in which an employee generally has physical access to all areas of the office in which they work. In another example, a user corresponding to a visitor to the company may have an associated access level providing a more limited selection of the sub-spaces 101 of the virtual space. With reference to the example of FIG. 1, a visitor to the company may be provided with a selection of sub-spaces corresponding to reception 101g, waiting room 101e, and coffee room 101i.

The user device 202a transmits a sub-space selection request (303). The server 201 provides access to the selected sub-space 101 including the sub-space functions. The sub-space functions include a communication function for establishing communication with another user device such as user device 202b. The user device 202a may use the communication function of the virtual sub-space to request to establish a communication link with user device 202b (305). For example, a user of user device 202a may occupy a virtual sub-space 101a, and wish to virtually visit a user of user device 202b occupying virtual sub-space 202b. The request to establish communication may be provided to the user of user device 202b as a virtual "knock". User device 202b may receive a knock notification to inform them that user of user device 202a wishes to have a discussion or simply enter the virtual sub-space of user device 202b. The user of user device 202a may specify the type of communication link to be established when requesting communication to be established.

However, in some examples, the communication function may be automatically initiated without a request from the user device 202a. For example, for a sub-space such as the boardroom which is accessible to all users, a communication link such as a video meeting may automatically be established upon receiving a selection request to enter the sub-space for all users of the boardroom. Accordingly, meetings may be accessible to all users whose access level provides them with access to the boardroom. Visitors external to an organization for example may have an access level which means the board room is not accessible to them. In some cases, a visitor may be provided with an invitation to a meeting, for example in the boardroom, such that when they access the virtual space, their access level is determined such that the boardroom is available to them for a limited period specified by the invitation, for example.

The user device 202b may acknowledge the request and establish a communication link with the user device 202a (306). In some examples, the communication link is established automatically without requiring an acknowledgement from the user device 202b.

The user device 202b may also be a user of the virtual space 100. For example the user device 202b may correspond to another employee of the company logged into the virtual space, or the user device 202b may correspond to a visitor to the virtual space, such as a client, for example. However, in some examples the user device 202b is not a user of the virtual space. The communication function provides means for contacting different user devices 202b internal and external to the virtual space. In this way, the communication function provides for a convenient means for a user to initiate phone calls or video conferences, or text based messages in a virtual environment which mimics a physical office environment.

In some examples, the user device initiating the communication may be a user of a user device external to the virtual space. The user device 202a within the virtual sub-space may receive a notification of the incoming communication via the virtual sub-space. Accordingly, the communication function of the virtual sub-space may be configured to establish communication between user devices 202a, 202b where communication is initiated outside of the virtual space.

The communication link may be audio, video or text communication. For example, the communication function may provide the ability to establish videoconferences, telephone calls, or instant text messaging. The communication function may comprise an application to support at least one of audio, video and text communication. For example, applications may include Microsoft Teams, Skype, etc. Telephone applications may provide for audio communication. Messaging applications such as SMS applications, Whatsapp may provide for text communication provided via the virtual space.

The functions provided by the virtual space and virtual sub-spaces will now be described in more detail.

Figure 4:
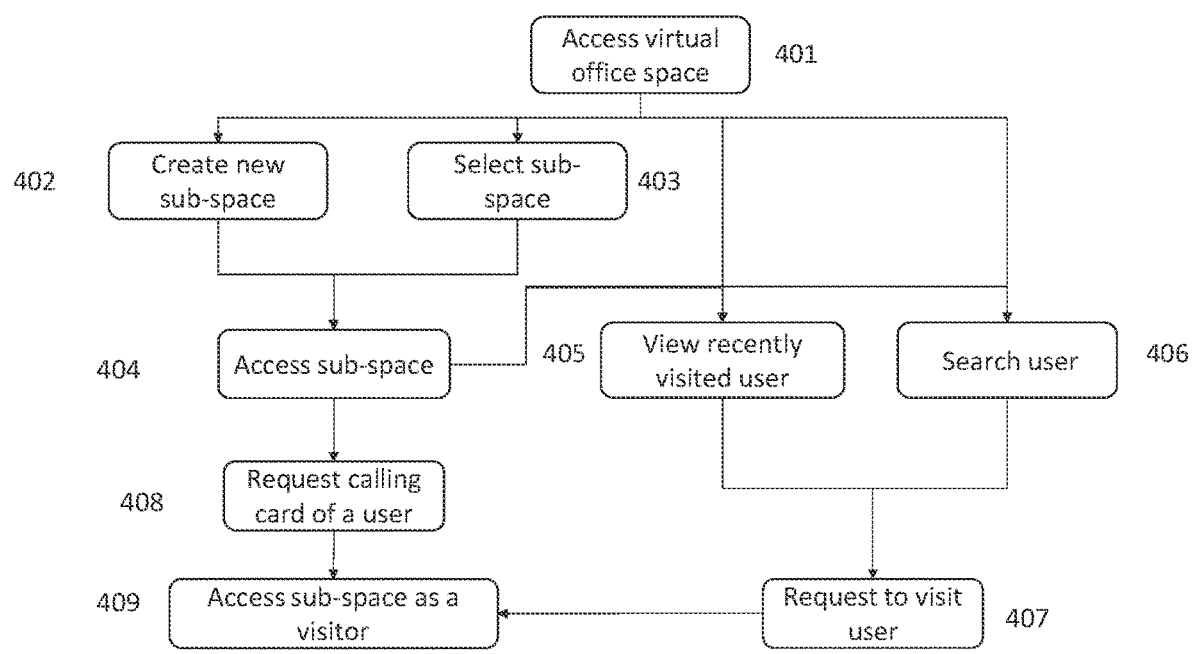
FIG. 4 is a flow chart illustrating operations which may be performed according to aspects of the specification.

FIG. 4 is a flow chart illustrated operations which may be performed by a user of the user device 202a using the virtual space 100 in accordance with an example of the present specification.

At operation 401, the user device accesses the virtual space. As described above, the user may provide identification and/or authentication information which may allow the server to associate an access level with the user. The user device is provided with access to the virtual space according to the associated access level.

Once the user device has accessed the virtual space, there are a number of possible options available to the user. The options available may depend on the access level of the user. In one example, the user is an employee of a company for which the virtual space has been provided. The employee may be provided with a high access level. In the example of FIG. 4, the options available to the user are to: create a new sub-space, select a sub-space, view a recently visited user, and to search a user. It will be recognised that additional/alternative options may be available to a user depending on their access level, or fewer options may be available to some users.

As described, the virtual space is configured to be customisable to the preferences of the company, and optionally to the preferences of the employees. In an example, a user who has accessed the virtual space may be provided with an option to create a sub-space within the virtual space as illustrated by operation 402. For example, an employee may wish to create a dedicated workspace for themselves within the virtual space. The dedicated workspace may be customised akin to a physical cubicle space such that the functionality provided by the sub-space allows the user to perform the tasks that are usually performed in a physical office environment in an intuitive manner. As described above, the sub-space may be customised with a number of functions, including a communication function allowing the user device to connect to other user devices. In this way, the user of the user device is able to interact with other users of the virtual space in a manner corresponding to physical work environment interactions.

Other functions which may be provided include collaboration workspace functions allowing users to collaborate on work together via their respective user devices. Other functions may include document display and storage. Applications having specific functionality may be installed by the user. The virtual sub-space may provide an application repository from which user may select the applications they wish to customise their space with, to provide their desired functionality.

The user may add a description to their sub-space. For example, any of the labels of the sub-spaces 101a to 101i, or any alternative suitable labels may be added to a sub-space depending on user preference. In addition, profile information of the user may be added to the sub-space to add a further element of personalisation to the sub-space. The profile information may include details such as job title, department, etc. A user may also add a picture to be associated with the sub-space. For example, an employee creating a dedicated workspace may add a picture of themselves to the sub-space. For a user creating a coffee room, the user may add an image of coffee to be associated with the sub-space.

The applications and any associated settings of the sub-space may be stored at the server such that the applications and functions are available at subsequent times the sub-space is accessed.

Operation 402 may only be provided as an option for uses having a high access level, such as employees. For users who have a low access level, such as customers temporarily visiting the virtual space, for example, option 402 may not be provided as an option.

On accessing the virtual space at operation 401, a user may instead choose to select a sub-space from a predetermined selection of sub-spaces. The virtual space includes one or more sub-spaces, and a predetermined selection of these sub-spaces are provided to the user device depending on the access level of the user as described above. At operation 403 the user of the user device may select one of the available sub-spaces. In some examples, the available sub-spaces may be accessed by the user on an unlimited basis, depending on the access level. A user having a high access level, such as an employee, may have a large selection of sub-spaces available.

A user with a low access level, such as a customer temporarily visiting the virtual space may have a small selection of sub-spaces available. For example, reception 101g, and coffee room 101i may be provided as the predetermined selection of sub-spaces available. In other examples, such as a user such as a client, who is invited to the virtual space for a meeting with an employee, the sub-space of the employee who invited the user may be available for selection by the user. In some examples, if a meeting has been arranged between an invited client and an employee of the company, then the employee's sub-space may be part of the selection of sub-spaces available to the visitor. For example, a visitor having arranged a meeting with Tomas may be provided with sub-space 101b labelled "Tomas" available for selection. In another example, the visitor may be provided with an initial selection of sub-spaces 101 including reception 101g. On establishing a communication link with a user of the "reception" sub-space 101g, reception may confirm that the client has a meeting with Tomas. The reception sub-space may include a function for adding an additional sub-space to a visiting client's predetermined selection of sub-spaces, thus adding Tomas' sub-space to the client's selection of sub-spaces. Accordingly, the client may then select Tomas' sub-space in order to establish a communication link with Tomas and begin the meeting.

After either of operations 402 or 403, the user device accesses the sub-space at operation 404. That is, if the user has created a new sub-space, then the user device can access the sub-space after it has been created. Similarly, once a sub-space has been selected by the user, the user can access the sub-space. While the sub-space is accessed by the user, the user may become visible to all users of the virtual space. That is, in a similar way to a physical office where the presence of colleagues can be determined visually, the presence of users of the virtual space can be determined based on when they are accessing a sub-space. Prior to accessing a sub-space, the user is not visible to other users as being available. Therefore, to be viewed and selected for visiting, a user must be accessing a sub-space. The status of the sub-space may be set to "available" to indicate that the user is in the sub-space.

A user in a sub-space may set a sub-status. For example, the user may set their status as "free", "busy", and "do not disturb". The user may receive a visitor in any state, unless the sub-space is empty and therefore unoccupied by the user. While the sub-status is set to "free" or "busy", visitors may request to visit the user's sub-space, and the user may accept or reject visitors accordingly, in a process explained in more detail with reference to FIG. 5.

However, while the sub-status is set to "do not disturb", a visitor may not be able to request to visit the user. Accordingly, while set to "do not disturb", a request to visit or otherwise establish a communication link will not be transmitted to the user. For example, a would-be visitor is not provided with the option to request to visit the user having their status set to "do not disturb". Accordingly, visit requests are prevented from being transmitted to the user device of a user who has set their status to "do not disturb". The user may summon a visitor however, while the user's status is "do not disturb". Therefore, visitors may only visit at the user's request while the user's status is set to "do not disturb". That is, the user may initiate a communication link to be established while their status is set to "do not disturb", but will not receive requests to establish a communication link from another user.

While a user is being visited by a visitor, the user's status may be set to "having visitors". In some examples, other users may be able to view information regarding users in the sub-space, such as their names for example. That way, users are able to view which colleagues are having meetings in which sub-spaces. If a user visits a colleague in a different sub-space, then their status in their sub-space may be set to "visiting colleague". If a calling card to visit the user while they are visiting a colleague in another sub-space, the user can leave their colleague's sub-space and return to their own sub-space to receive the visitor that requested the calling card.

On accessing the virtual space at operation 401 a user may choose to view a recently visited user at operation 405. For example, if a user collaborates regularly with another co-worker who is also a user of the virtual space, then the option to visit such a user may be provided to the user. A list of users to select may be provided to the user. The list may be generated on the basis of most recently visited users, most frequently visited users, a priority list generated by the user, or any suitable preference of the company and/or the user for convenience. The list may include a list of sub-spaces together with their current users. The list may additionally include the status of the users.

Returning to operation 401, on accessing the virtual space the user may choose to search for a user. For example, a user may wish to have a conversation with a specific employee. A search function provides the user with the ability to locate the user with which they wish to speak rapidly.

Operations 405 and 406 may also be performed after operation 404 when a user has accessed a sub-space. Therefore, the sub-space accessed at 404 may comprise functions for viewing recently visited users and/or for searching for other users.

On selection of a user's sub-space at operations 405 and 406, more detailed information of the user may be provided. For example, the detailed information may comprise profile information associated with the user's sub-space, such as job title, department, etc.

After either of operations 405 or 406, the user may select a viewed a searched user and request to visit that user at operation 407. The request to visit the user may cause a visit request to be transmitted to the user device of the user to be visited. The user to be visited may be occupying their own sub-space. The sub-space may include functionality to notify the user to be visited that a visit request has been received. The notification may be an audio and/or a display notification. For example, an alert sound such as a doorbell may be triggered by the visit request. Alternatively or additionally, a display notification may appear on a display of the user device to indicate the visit request This display may indicate details of the user requesting to visit, such as their name, for example, together with any text indicating the purpose of the visit. If the request is granted by the user to be visited, then their sub-space may be accessed by the visiting user at operation 409. The sub-space of the user being visited then provides for a communication link to be established between the user devices of the visiting user and the user being visited. For example, a videoconference/teleconference may be established, enabling the users to see and/or hear each other. Accordingly, by accessing the same sub-space to "visit" another user, communication may be established between the users in a convenient manner in a similar way to an employee knocking at a cubicle of a colleague and entering the cubicle to hold a conversation with the colleague.

Returning to operation 404, another option for contacting another is provided at operation 408. While the user is in their sub-space, they may request a calling card of a user to be visited. A number of options may be available to the user to be visited in response to a call card request. The user to be visited may allow the visiting user to enter, may ask them to wait, or may deny entry. A process relating to use of calling cards is described in more detail below with reference to FIG. 5.

Figure 5:
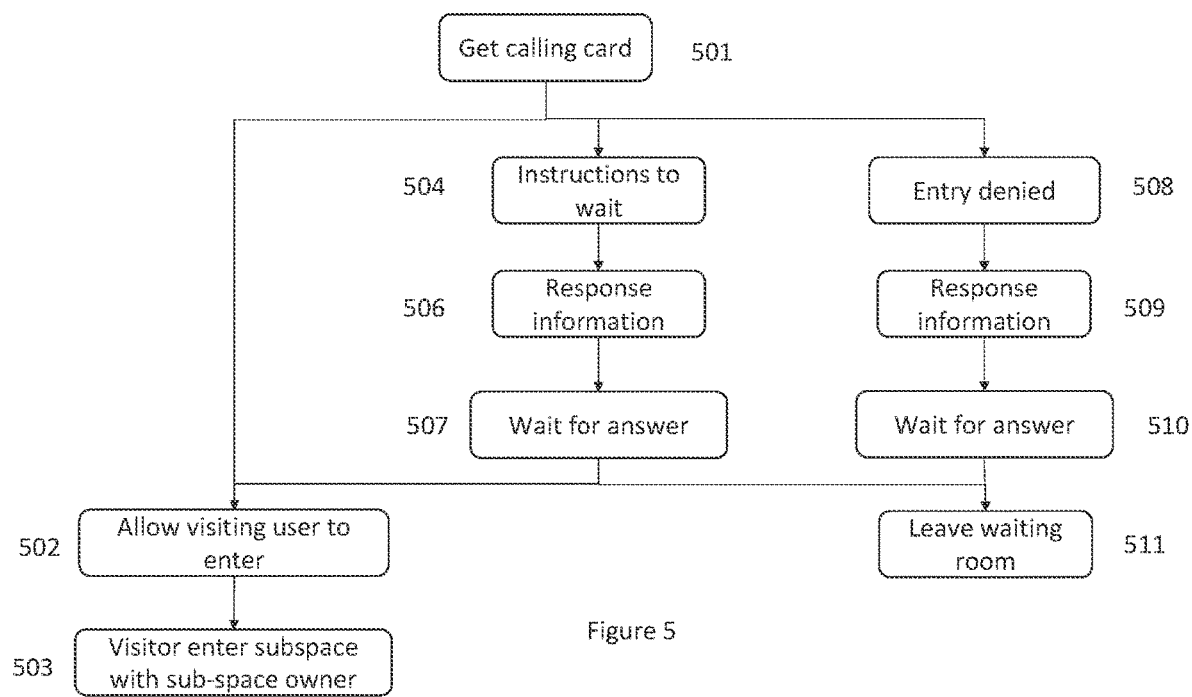
FIG. 5 is a flow chart illustrating operations which may be performed according to aspects of the specification.

FIG. 5 is a flow chart illustrating a number of operations which may be performed by a user of a user device having access to the virtual space. In particular the operations of FIG. 5 relate to obtaining a calling card to visit another user of the virtual space.

The user wishing to visit another user (i.e. a "visiting user", or "visitor") may request a calling card for a user to be visited at operation 501. The calling card request is sent to the user device of the user to be visited from the user device of the visiting user. The visiting may enter a sub-space corresponding to a waiting room. The waiting room may be configured to be specific to the user to be visited, or it may be a general waiting room for any user waiting for a response to a calling card. The user to be visited may send a reply in response to the call card request. At operation 502, the user to be visited may permit entry to their sub-space. At operation 502 the visitor may enter their sub-space. A communication link such as a video, audio or text communication link is established between the user devices of the visitor and the user being visited to enable the users to communicate with each other within the sub-space.

At operation 504, the user to be visited may not allow the visiting user to enter their sub-space. Instead, the user to be visited may provide instructions for the visiting user to wait. The instructions may be provided to the visiting user as text displayed at the user device of the visiting user. The instructions may be input at the user device of the user to be visited and received at the user device of the visiting user. The visiting user may provide a response at operation 506. The response may be provided in text format and received at the user device of the user to be visited. For example, the visiting user may indicate that they wish to speak with the user to be visited urgently. Alternatively, the visiting user may reply with a message accepting the request to wait, or another suitable response. At operation 507, the visiting user may wait for a reply. The user to be visited may, after a time period, provide the visiting user with access to their sub-space at step 502. The visitor then enters the sub-space at operation 503 as described above. Alternatively, the visiting user may choose to leave the waiting room at operation 511.

At operation 508, the user to be visited may reply to the calling card request by denying entry. The visiting user may be updated with a notification at their user device that their visit request is denied. The visiting user may provide a response, for example by indicating if the matter is very urgent, at operation 509. The visiting user may wait for a reply at operation 510. The user to be visited may choose to permit entry at operation 502 and the visiting user may enter the sub-space at operation 503 as described above. Alternatively, the visiting user may choose to leave the waiting room at operation 511.

A calling card may be requested for any sub-space which is occupied by a user. For example, the sub-space may be occupied by a user having a status set to indicate they are free, busy, or have a visitor.

Figure 6:
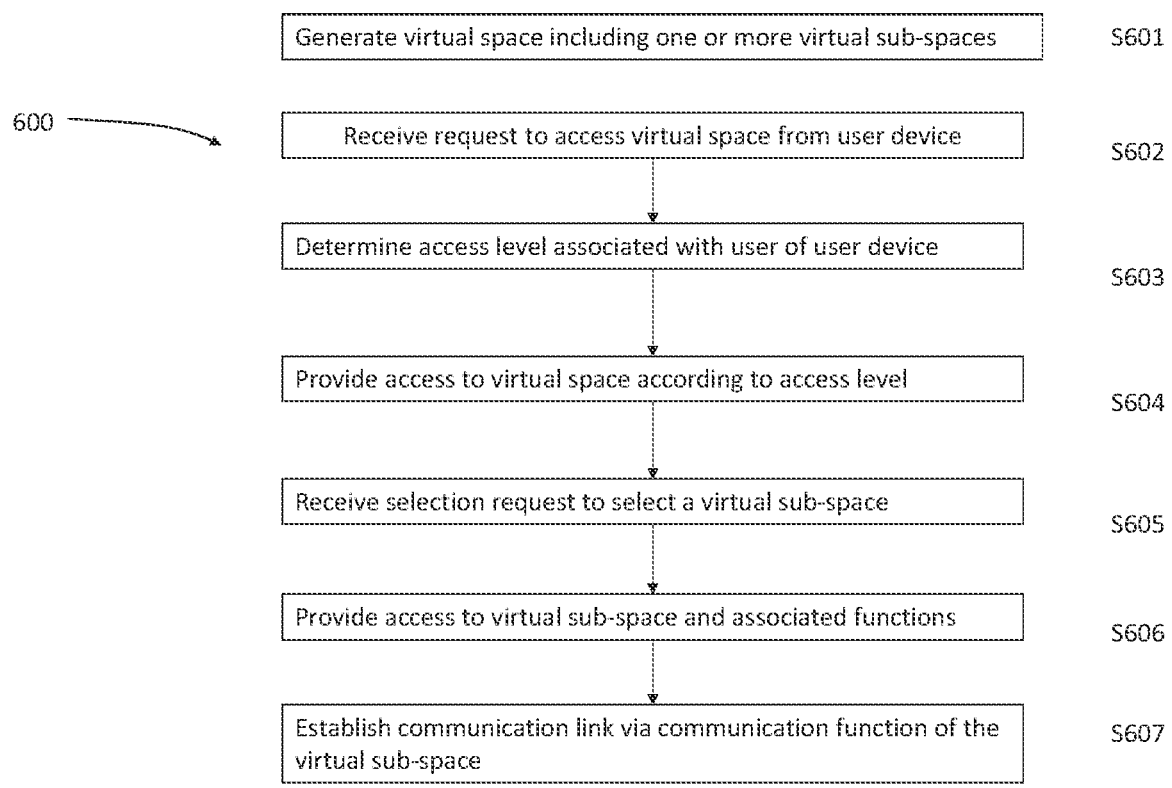
FIG. 6 is a flow chart illustrating a method according to aspects of the specification.

FIG. 6 is a flow diagram illustrating an example method 600 according to an aspect of the present specification. It will be recognised that not all of the steps need be performed, or may be performed in a different order. In some examples, the method may include additional/alternative steps. The communication method comprises generating a virtual space comprising one or more virtual sub-spaces. Each of the virtual sub-spaces comprises a directory address, one or more associated functions including a communication function, and one or more customisable settings (601). The communication method comprises receiving a request to access a virtual space from a user device (S602). The virtual space comprises one or more virtual sub-spaces, each virtual sub-space comprising one or more functions including a communication function. The method may further comprise determining an access level associated with a user of the user device (S603). As described above, the determined access level may be based on identification and/or authentication information provided from the user via the user device.

The method further comprises providing access to the virtual space according to an access level associated with the user of the user device (S604). The access level associated with the user provides access to a predetermined selection of the virtual sub-spaces.

The method further comprises receiving a selection request from the user device to select a virtual sub-space (S605). The method further comprises providing access to the user device to the selected virtual sub-space and associated functions (S606). The directory address of the virtual sub-space may then be associated with the user device. The method further comprises establishing a communication link via the communication function of the virtual sub-space.

The present specification describes a number of examples. It should be appreciated that the particular examples shown and described herein are illustrative of the invention and its best mode and are not intended to limit in any way the scope of the invention as set forth in the claims. The features of the various examples may be stand-alone or combined in any combination. Further, unless otherwise noted, various illustrated steps of a method may be performed sequentially or at the same time, and not necessarily in the order illustrated. It will be recognised that changes and modifications may be made to the examples without departing from the scope of the present specification. These and other changes or modifications are intended to be included within the scope of the present specification, as expressed in the following claims.

The invention claimed is:

1. A communication method comprising:
generating a virtual space comprising a plurality of virtual subspaces, wherein each of the plurality of virtual subspaces comprises (a) a respective directory address that is different from a directory address of the other of the plurality of virtual subspaces, (b) at least one associated function that is different from an associated function of the other of the plurality of virtual subspaces, (c) a communication function, and (d) one or more customizable settings, wherein the one or more customizable settings are selected by a user device, wherein the associated function comprises one or more of: document storage function for storing digital documents, browsing history of a user, or details of decent meeting-related interactions and a speed dial communication function for storing a speed-dial list of contacts most frequently used by the user device;
receiving a request from the user device to access the virtual space;
providing the user device with access to the virtual space according to an access level associated with a user of the user device;
providing the user device with access to one of the plurality of virtual subspaces in accordance with the access level associated with the user of the user device, wherein the access level provides the user device with a predetermined selection of the plurality of virtual subspaces, wherein the user device is denied access to a virtual subspace outside of the predetermined selection;
receiving a selection by the user device of one or more customizable settings for the one of the plurality of virtual subspaces;
configuring the one of the plurality of virtual subspaces in accordance with the customizable settings;
associating the respective directory address of the one of the plurality of virtual subspaces, and its configured customizable settings, with the user device;
utilizing the user device, the user creating a customized subspace within the virtual space and adding functionality to the customized subspace;
receiving a calling card request at the user device from a second user device associated with a second user to enter the customized subspace;
providing the second user device with access to a waiting room virtual subspace;
receiving a confirmation from the user device to allow access to the customized subspace to the second user device; and
providing the second user device with access to the customized subspace upon receiving the confirmation, wherein upon providing the second user device access to the customized subspace, a communication link is established between the user device and the second user device.

2. The communication method according to claim 1, further comprising determining the access level corresponding to the user based on authentication information received from the user device.

3. The communication method according to claim 1, wherein a first access level provides a first predetermined selection of the plurality of virtual subspaces to the user device, and a second access level provides a second predetermined selection of the plurality of virtual subspaces to the user device, wherein the second predetermined selection of the plurality of virtual subspaces is a larger selection of the plurality of virtual subspaces than the first predetermined selection of the plurality of virtual subspaces.

4. The communication method according to claim 1, wherein a first access level is associated with the user, and a second access level is associated with the second user associated with the second user device, and wherein authentication information is received from (a) the user device and authenticated by an authentication provider of the virtual space, and (b) the second user device and authenticated by the authentication provider of the virtual space.

5. The communication method according to claim 4, further comprising associating a given access level with the user for a limited period in accordance with an invitation.

6. The communication method according to claim 1, wherein the communication comprises at least one of audio, video, and online text.

7. The communication method according to claim 1, further comprising receiving a status update request from the user device to update a status of a virtual subspace, and updating the status of the virtual subspace in accordance with the status update request.

8. The communication method according to claim 1, further comprising receiving a search request from the user device to search for a third user device; and providing information relating to a virtual subspace occupied by a third user to the third user device.

9. The communication method according to claim 1, further comprising the steps of: a third user device receiving a visit request from the user device to visit a virtual subspace occupied by a third user; and in response to receiving a visit approval response from the third user device, providing access to the virtual subspace occupied by the third user to the user such that a second communication link is established between the user device and the third user device.

10. The communication method according to claim 1, wherein when a status of the user when in a virtual subspace indicates that the user does not want to be disturbed, and the method further comprises the step of preventing visit requests from being transmitted to the user device.

11. An apparatus comprising at least one processor and a tangible, non-transitory memory configured to communicate with the processor, the memory having stored thereon instructions which, when executed by the processor, are configured to cause the apparatus to execute the method according to claim 1.

12. A communication system comprising a server, a first user device and a second user device, the communication system being configured to perform the method according to claim 1.

13. The communication system according to claim 12, wherein the server is further configured to store settings relating to the plurality of virtual subspaces and associated functions.

14. The communication system according to claim 12, wherein the server is configured to verify authentication information received from the user device and/or the second user device, and to associate the access level with a user of the user device and/or the second user of the second user device based on the received authentication information.

15. The communication system according to claim 12, wherein the server is further configured to provide the access level corresponding to the user based on authentication information received from the user device.

16. The communication system according to claim 12, wherein the server is further configured to provide the user device (a) a first access level to a first predetermined selection of the plurality of virtual subspaces, and (b) a second access level to a second predetermined selection of the plurality of virtual subspaces, and wherein the second predetermined selection of the plurality of virtual subspaces is a larger number of the plurality of virtual subspaces than the first predetermined selection of the plurality of virtual subspaces.

17. The communication system according to claim 16, wherein the first access level is associated with the user, and the second access level is associated with the second user, and wherein first authentication information is received from the user device, and second authentication information is received from the second user device, and the first authentication information and second authentication information are authenticated by an authentication provider of the virtual space.

18. The communication system according to claim 17, further comprising associating a given access level with the user for a limited period in accordance with an invitation sent by the server.

\* \* \* \* \*